(12) United States Patent
Anghileri

(10) Patent No.: US 7,909,288 B2
(45) Date of Patent: Mar. 22, 2011

(54) CRASHWORTHINESS STRUCTURE AND METHOD

(75) Inventor: Marco Anghileri, Milan (IT)

(73) Assignee: Politecnico di Milano, Milan (IT)

(*) Notice: Subject to any disclaimer, the term of this patent is extended or adjusted under 35 U.S.C. 154(b) by 194 days.

(21) Appl. No.: 10/555,439

(22) PCT Filed: May 26, 2004

(86) PCT No.: PCT/EP2004/005759
§ 371 (c)(1),
(2), (4) Date: Jun. 27, 2006

(87) PCT Pub. No.: WO2004/106155
PCT Pub. Date: Dec. 9, 2004

(65) Prior Publication Data
US 2006/0243858 A1 Nov. 2, 2006

(30) Foreign Application Priority Data
May 30, 2003 (IT) .................. MI2003A1086

(51) Int. Cl.
*B64D 37/32* (2006.01)
*B64D 25/00* (2006.01)
(52) U.S. Cl. ............................. 244/129.2; 244/135 R
(58) Field of Classification Search .......... 220/4.14, 220/562, 560.07, 560.11, 203.08; 244/135 B, 244/135 R, 135 A, 135 C, 129.2
See application file for complete search history.

(56) References Cited

U.S. PATENT DOCUMENTS

| | | | | |
|---|---|---|---|---|
| 2,430,905 A | * | 11/1947 | Bradley | 206/521 |
| 2,432,025 A | * | 12/1947 | Lorenz | 137/590 |
| 2,889,070 A | * | 6/1959 | Coffman | 220/89.2 |
| 3,854,522 A | * | 12/1974 | Didycz et al. | 165/53 |
| 3,938,764 A | | 2/1976 | McIntyre et al. | |
| 4,104,878 A | * | 8/1978 | Chase | 60/245 |
| 4,426,050 A | | 1/1984 | Long | |
| 4,629,861 A | * | 12/1986 | Hibler, Sr. | 219/137 R |
| 4,715,417 A | * | 12/1987 | Coloney | 220/666 |
| 4,890,764 A | | 1/1990 | Rossini | |
| 5,038,960 A | * | 8/1991 | Seery | 220/723 |
| 5,360,129 A | | 11/1994 | Lee | |
| 5,383,566 A | * | 1/1995 | Johnson | 220/562 |

(Continued)

FOREIGN PATENT DOCUMENTS

DE 703 201 3/1941

(Continued)

OTHER PUBLICATIONS

Machine translation of DE3049429A1.*

(Continued)

*Primary Examiner* — Tien Dinh
*Assistant Examiner* — Richard R Green
(74) *Attorney, Agent, or Firm* — Nixon & Vanderhye, P.C.

(57) ABSTRACT

What is described is a locally yielding structure (1) with high energy absorption for aeronautical applications, the said structure being substantially closed and substantially rigid, characterized in that at least one wall (3) of the said substantially closed structure comprises at least one vent valve (8) which can be opened when a pressure exceeding a predetermined value is present within the substantially closed structure (1). In a particularly advantageous application, the invention is used in connection with a helicopter tank and enables the subfloor to be used to absorb energy by being deformed during any impact on the ground. The present invention is also advantageous for limiting the damage caused by explosions in an aircraft fuselage.

31 Claims, 6 Drawing Sheets

U.S. PATENT DOCUMENTS

| | | | |
|---|---|---|---|
| 5,451,015 A | | 9/1995 | Cronkhite et al. |
| 5,542,626 A | | 8/1996 | Beuck et al. |
| 5,558,114 A | * | 9/1996 | Strelow .................. 137/68.27 |
| 5,875,996 A | | 3/1999 | Borgia |
| 5,948,503 A | | 9/1999 | Yamamoto et al. |
| 6,109,310 A | * | 8/2000 | Peotter ........................ 141/7 |
| 6,231,009 B1 | * | 5/2001 | Kong ...................... 244/135 R |
| 6,491,255 B1 | * | 12/2002 | Bracken et al. ........... 244/135 R |
| 6,589,687 B1 | * | 7/2003 | Konno et al. .................. 429/56 |
| 2001/0010345 A1 | * | 8/2001 | Clifford ........................ 244/119 |
| 2002/0047016 A1 | * | 4/2002 | Ishikawa et al. .............. 220/562 |

FOREIGN PATENT DOCUMENTS

| | | | |
|---|---|---|---|
| DE | 703201 C1 | * | 3/1941 |
| DE | 30 49 429 A1 | | 7/1982 |
| DE | 3049429 A1 | * | 7/1982 |
| EP | 0 337 932 A2 | | 10/1989 |
| EP | 1 120 340 A2 | | 8/2001 |

OTHER PUBLICATIONS

Translation of DE-3049429.*
Spandaccini, Louis J., "Development of an Experiment for Determining the Autoignition Characteristics of Aircraft-Type Fuels", Sep. 1977, NASA-CR-135329, National Aeronautics and Space Administration.*
International Search Report of PCT/EP2004/005759, mailed Sep. 27, 2004.
McGraw-Hill Zanichelli, Dizionario Enciclopedico scientifico e tecnico, 1985, p. 480, 596.
Wikipedia, http://en>wikipedia.org/wiki/Elastomer.

* cited by examiner

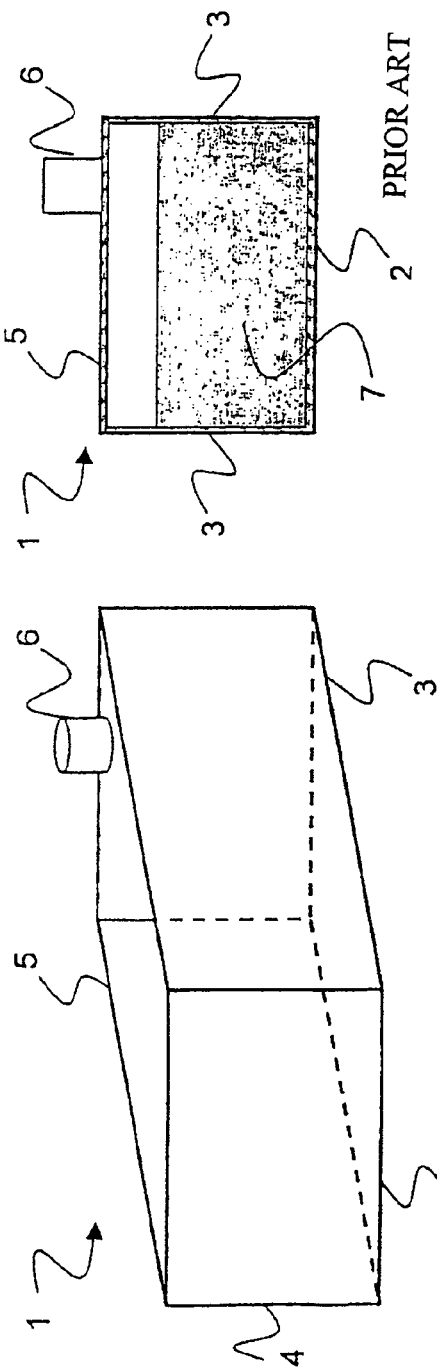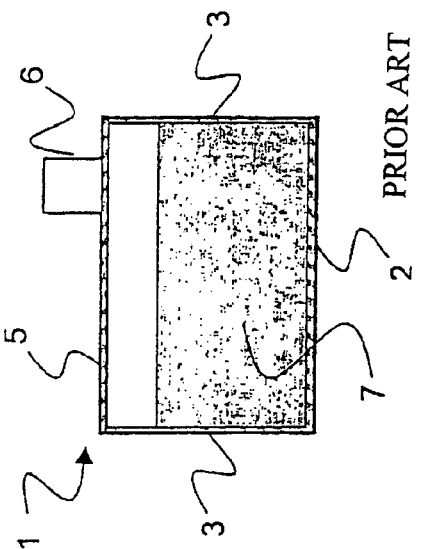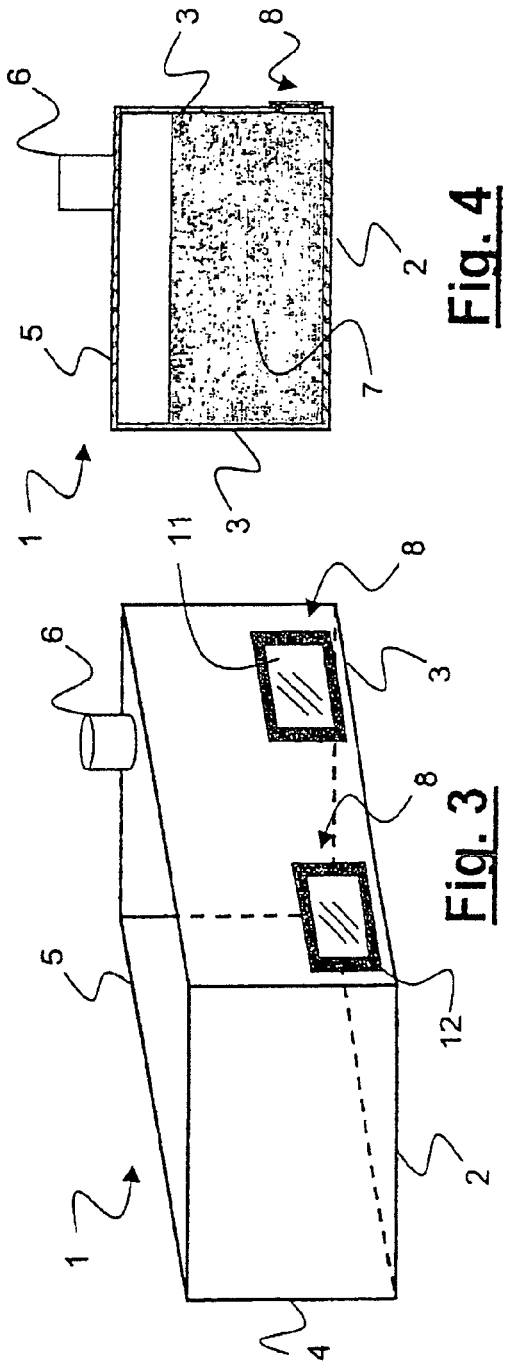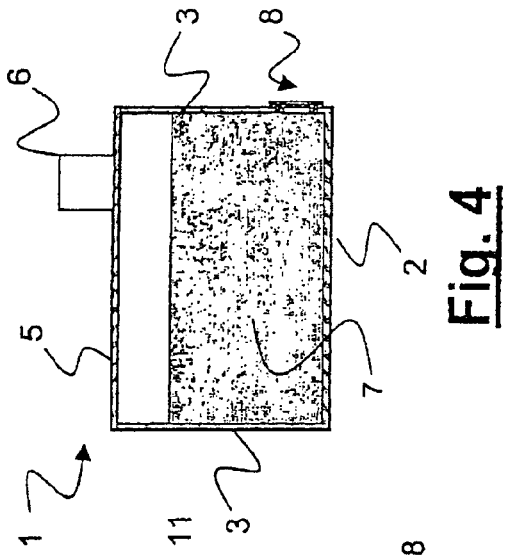

CRASHWORTHINESS STRUCTURE AND METHOD

This application is the US national phase of international application PCT/EP2004/005759, filed 26 May 2004, which designated the U.S. and claims priority of IT MI2003A 001086, filed 30 May 2003, the entire contents of each of which are hereby incorporated by reference.

BACKGROUND

I. Field of the Invention

The present invention relates to the field of passive safety in structures, particularly aeronautical structures. Even more particularly, the present invention relates to a subfloor structure for fixed- or rotary-wing aircraft having innovative energy absorption characteristics and a new method for enhancing the passive safety of an aircraft in case of impact.

II. Related Art and Other Considerations

Research into the impact safety of aeronautical structures of helicopters and of flying machines in general originated from a series of observations and statistical analyses carried out from the 1960s and 1970s onwards. This research had the merit of demonstrating for the first time that the consequences of impacts of aircraft, particularly helicopters, on the ground could be limited, provided that action was taken to prevent clearly identified hazardous events, such as the development of fire, the penetration of large suspended masses into the cabin, the action of intense acceleration on the occupants and the intrusion of panels and other structural components into the passenger space.

The increasingly precise identification of these events has made it possible to issue detailed military and civil specifications which have a significant effect on the design philosophy relating to the latest generation of helicopters and those of future generations. These specifications enable the nature of the problem to be defined unambiguously and clearly state the objectives to be attained.

If the requirements of "crashworthiness" (impact safety, or more generally passive safety) are to be met, research and development must be broadened in scope and become more detailed, the passive safety standards themselves must be progressively improved, and there must be a radical change in design philosophy. For example, a helicopter structure can have satisfactory crash behaviour only if the passive safety specifications are analysed at the preliminary design stage.

By way of example, the total energy absorption of a helicopter is obtained not only by exploiting the contributions offered, in sequence, by the handing gear, the lower part of the fuselage ("subfloor"), the seat with its supports and the roof with the transmission support structure. This is because the satisfactory crash behaviour of each of these components considered separately is not necessarily sufficient to ensure the satisfactory behaviour of the structure considered as a whole; it is also necessary to study and optimize the behaviour of all the elements taken together. The necessity of considering different aspects of the phenomenon simultaneously has led to the identification of new design systems.

The provision of an impact-resistant ("crash-resistant") helicopter structure leads to increased costs, owing to the additional expense of a design process made more difficult by the constructional and technological complications and by the reduction of the useful volume and load capacity. On the other hand, the requirement to preserve passenger safety is of fundamental importance; it is therefore always necessary to seek structural arrangements and solutions which are efficient and effective in relation to energy absorption, and which can raise safety levels with a minimum increase in weight and cost.

Clearly, however, it is impossible to guarantee the survival of occupants in every type of accident, and therefore attention must be paid to the category of impact defined as "potentially survivable crashes", in which the level and duration of stresses transmitted to the passengers do not exceed the limits of human tolerance.

Research has been carried out into the acceleration which a human being can withstand in an impact, and the results have shown that a human being can withstand horizontal accelerations of up to 45 g, but only for a very short period. These values decrease markedly if the acceleration acts in the vertical direction; in this case, the limit of tolerance becomes approximately 17 g for 0.04 seconds, falling to 5 g for 0.2 seconds.

All these data are fundamental to the design of structures capable of transmitting, in an impact, only those stresses which can be withstood by human beings, in order to ensure the survival of the latter. The object to be achieved is therefore that of designing and producing structures capable of being deformed to such an extent and in such a way as to limit the levels of acceleration to which the occupants of the aircraft are subjected, while ensuring the preservation of a survival cell.

These structures must be able to absorb energy by their controlled and programmed deformation. They must also preferably be positioned in the lower part of the fuselage of the aircraft or of the helicopter, since, in most cases, it is the lower part that impacts on the ground.

Among the other aspects of safety which increase the possibility of survival even after impact on the ground, the most important is unquestionably that of the prevention of fire and explosion and that of the reduction of the effects caused by these phenomena.

The cause of the development of a fire or an explosion in case of a crash is essentially the presence of the fuel system installed in the vehicle. The basic requirement is unquestionably the containment of the fuel. For this reason, the tanks and tubing of the fuel system must be strong and yet deformable; and they must be installed remotely from the systems or elements which may initiate a fire.

The present standards require that the tank, either full-scale or on a reduced scale, or portions of it, pass drop tests without showing any leakage. Each standard stipulates the main characteristics of this test, in other words the height of fall, the degree of filling of the tank, the presence of any fittings or of the structure of the aircraft which surrounds it. For example, some standards stipulate the complete filling of the tank and a height of fall of 20 m; others require 80% filling and a height of fall of 15.2 m.

In the present state of the art, the standards are applied in the military field only; in the civil field there are no known helicopters which meet the safety requirements concerning fire prevention.

It is clear from the above that, on the one hand, it is desirable to have a highly deformable subfloor structure which can absorb some of the energy in case of impact, while, on the other hand, it is necessary to have a fuel tank (generally housed in the subfloor area, in the case of a rotating wing aircraft for example) which is not deformed, in order to avoid highly dangerous deflagration.

Similarly, although air transport is considered to be safer than ground transport (whether by road or rail), it is highly vulnerable to terrorist attack and the risk that terrorists may place an explosive device on board an aircraft is always very high. The approach followed by designers up to the present has again been that of providing increasingly stiff and strong structures which can withstand explosions which may be caused intentionally or accidentally within the fuselage, particularly in its lower part or hold.

However, this approach conflicts with the requirement to provide deformable structures which absorb some of the energy developed in case of a crash or a bomb explosion. Moreover, the stiffening of a structure causes an inevitable and undesirable increase in weight, and in any case is generally insufficient to provide adequate protection against explosion.

U.S. Pat. No. 5,451,015 relates to an aeronautical composite structure with an integral fuel tank which tackles the problem of safety in case of impact.

U.S. Pat. No. 5,451,015 thus tackles a problem similar to that tackled by the present invention, but the solution is completely different, since, like the known solutions, it requires the stiffening of the structure.

U.S. Pat. No. 4,426,050 relates to tanks which can be released in advance in case of impact.

In other known solutions, the fuel is discharged if the pilot foresees a potential risk of crashing.

In the light of the prior art described above, the technology disclosed herein provides a structure, typically of the aeronautical type, which is locally yielding with high energy absorption and which also meets the requirements for passive safety of an aircraft.

The technology disclosed herein also provides a method for enhancing the passive safety of a structure, typically of the aeronautical type, with innovative and improved energy absorption characteristics.

The technology disclosed herein also provides a fuel tank, typically for aircraft, with innovative and improved energy absorption characteristics.

The technology disclosed herein comprises creation of suitably designed vent valves in the walls of a substantially closed aeronautical structure, particularly on the walls of a tank. In the case of a fuel tank, these valves enable the fluid to be released in impact conditions and to be transferred into appropriate lateral bags (or supplementary tanks), thus enabling the subfloor to act satisfactorily as an impact absorber, while simultaneously absorbing some of the impact energy which is transferred to the fluid. In the case of a fuselage within which an explosion occurs, the vent valves allow the exit of the energy developed in the explosion and prevent the explosion from causing breaches in the fuselage itself.

Thus technology disclosed herein operates on an entirely different and opposite principle to that followed up to the present, in other words that of having very strong structures. The technology disclosed herein, on the contrary, provides for substantially closed structures which, in case of an increase in pressure beyond a certain level, yield locally in predetermined positions in such a way as to reduce the pressure level.

The technology disclosed herein can conveniently be associated with conventional systems, such as safety valves, which can help to contain any fire, or at least to limit its extent, by cutting off the supply to the engines and isolating the tank.

In a first aspect, the technology disclosed herein provides a substantially closed structure, particularly for aeronautical applications, in which at least one of the walls of the structure comprises at least one vent valve which can be opened when the pressure inside the substantially closed structure exceeds a predetermined value, this predetermined value being at least twice (but preferably three times) the value of the normal operating pressure.

In a further aspect, the technology disclosed herein provides a method for enhancing the passive safety of a substantially closed structure, particularly for aeronautical applications, comprising the step of providing, in at least one wall of the structure, at least one vent valve which can be opened when the pressure inside the substantially closed structure exceeds a predetermined value, this predetermined value being at least twice (but preferably three times) the value of the normal operating pressure.

The technology disclosed herein is applicable to substantially closed and substantially rigid structures for aeronautical applications, for example fuel tanks (conveniently of the helicopter type) or fuselages.

BRIEF DESCRIPTION OF THE DRAWINGS

The invention will be made clear by the following detailed description, provided purely by way of example and without restrictive intent, to be read with reference to the attached sheets of illustrative drawings, in which:

FIG. 1 shows in a highly schematic way a known tank for subfloors of aircraft, in an axonometric view;

FIG. 2 shows a cross section through the tank of FIG. 1;

FIG. 3 shows in a highly schematic way a tank for subfloors according to one example embodiment;

FIG. 4 shows a cross section through the tank of FIG. 3;

DETAILED DESCRIPTION

Figure 5:
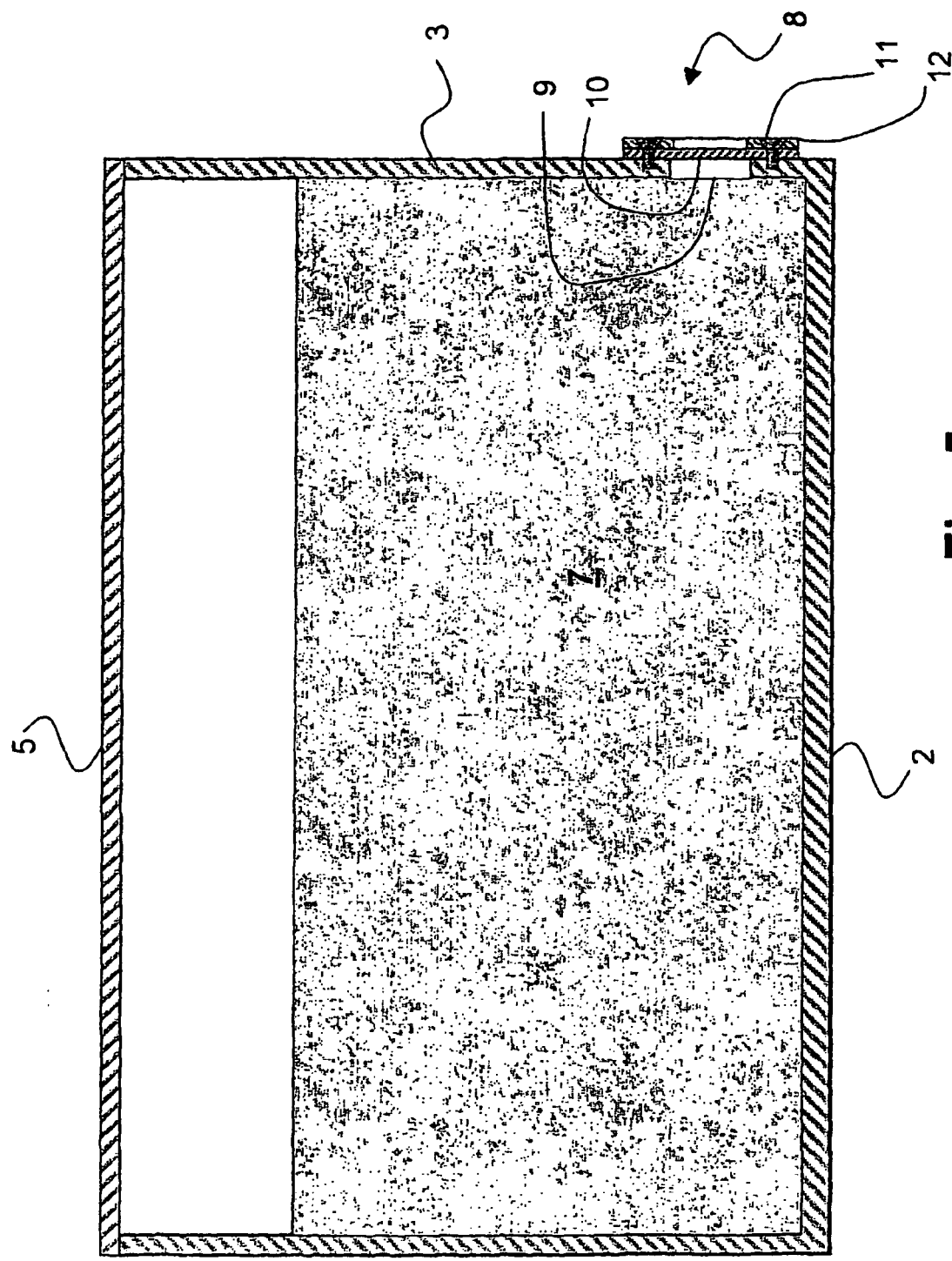
FIG. 5 shows the cross section of FIG. 4 on an enlarged scale.

By way of example, the technology disclosed herein will mainly be described with reference to helicopter tanks which represent only one of a plurality of substantially closed and substantially rigid structures for aeronautical applications. For the purpose of the technology disclosed herein, the term "substantially closed structure" denotes a structure having substantially closed but not necessarily sealed structure. Thus, a substantially closed structure for aeronautical applications may be, for example, a fuel tank, a fuselage, a hold, or the like.

Helicopter tanks are generally positioned in subfloors, mainly because of space considerations. For their part, the subfloors act as energy absorbers in emergency situations, for example in a situation of impact on the ground, in which they absorb the energy of the impact and thus decrease the acceleration transmitted to the occupants.

As stated above, in some situations the tanks can therefore constitute an impediment to the performance of the functions of the subfloor, but can also cause irreparable damage if the compression of the tank causes the explosion or the uncontrolled rupture of the tank itself. In other words, the presence of fuel within the tank limits, or, if the tank is full, completely compromises the required qualities of energy absorption. This is because the deformation of a tank causes the reduction of its capacity, in other words of the internal volume available to the liquid, and an increase in pressure which causes deflagration.

According to the technology disclosed herein, suitably designed vent valves are formed in the walls of the tank. In impact conditions, these valves enable the fluid to be released from the tank and transferred to suitable lateral bags, thus enabling the subfloor to act satisfactorily as an impact absorber, while simultaneously absorbing some of the impact energy which is transferred to the fluid.

It is known that there are various types of tanks. In some aircraft, the structure of the fuel compartment is sealed, and this compartment acts directly as a fuel tank. However, a tank of this type frequently gives rise to sealing problems, and for this reason many aircraft use a flexible bag or cell to contain the fuel. This bag is housed in the compartment. Finally, another type of tank consists of one or more substantially flexible bags which adapt themselves to suitable empty spaces formed between the ribs and bulkheads of the aircraft.

In one aspect, the technology disclosed herein provides a tank integrated into the subfloor of a helicopter, this tank being capable, even when full, of maintaining its qualities of absorption of the energy arising from an impact on the ground in emergency conditions.

A preliminary study has been carried out to describe the behaviour of a tank in whose walls there have been positioned safety valves which rupture when specified conditions are present, and which enable the liquid to emerge in a controlled way and thus prevent explosion.

In the first place, it was established that a tank completely filled with fuel undergoes an explosion when subjected to impact on the ground. For this purpose, use was made of a model designed for impacts at 50%, and this was suitably modified by filling it completely with liquid. The simulation confirmed the hypothesis of explosion: it was found that the large deformations undergone by the tank in the impact did indeed reduce the volume available to the liquid within it, and the increase in pressure caused deflagration. The hypothesis that the explosion of the tank might be due to problems of instability was disproved by the fact that the hourglass energy remained at zero while the kinetic energy decreased until after the rupture of the tank.

The inventor of the technology disclosed herein has realized that the pressure within a full tank can be decreased if the liquid is made to emerge from the tank in a guided, controlled and predictable way and is transferred to one or more supplementary tanks connected to the main tank. This increases the volume available to the liquid, by comparison with the volume available to the liquid in the case of a tank which undergoes deformation (compression). Thus the fuel remains substantially within the said tank (where the expression "tank" includes the standard tank and the supplementary tank), preventing explosion.

The basic principle is therefore that of making valves open as a result of the pressure of the liquid on the walls of the tank, thus permitting the fuel to flow out of the tank. For the purposes of the technology disclosed herein, in FIG. 1 a conventional tank 1 is illustrated substantially in the form of a closed boxlike element, typically made from bent sheet metal and riveted at its angles (for the sake of simplicity, the stiffening and riveting are not shown). The tank 1 has a base 2, four lateral walls 3, 4, and a cover 5. The tank also comprises a conventional filler tube 6. For simplicity, the illustrated tank does not include a flexible bag positioned inside the boxlike element, but the technology disclosed herein is equally applicable to this type of tank. If a bag is present, a flange, entirely similar to those present in bags for other purposes, is provided in the lateral wall of the substantially rigid structure of the tank for each vent valve. FIG. 2 shows a schematic cross section of the tank of FIG. 1 partially filled with liquid fuel 7.

According to the technology disclosed herein, vent valves 8 have been formed in the lateral walls of the tank, forming areas of weak material and/or areas which are thinner than the tank walls. FIG. 3 shows schematically two vent valves 8 in the form of apertures formed in one of the lateral walls 3 of the tank 1 and closed by breakable diaphragms. Alternatively, it would be possible not to cut out the apertures, but simply to create an engraved area by means of a weakened profile. FIG. 4 shows a cross section of the tank 1 according to the example embodiment shown in FIG. 3.

FIG. 5 shows the sectional view of FIG. 1, enlarged to show the vent valve 8 more clearly. The vent valve comprises an orifice or aperture 9 formed in the wall 3 of the tank and a breakable covering diaphragm 10 fixed, for example by means of rivets 11 or the like, to the wall 3. The rivets 11 are not shown in FIG. 3.

To compensate for the loss of rigidity due to the presence of the valves, the part surrounding these is preferably reinforced by thicker elements 12 (in the form of a frame, for example). The thicker elements 12, also known as an aperture stiffener, is seen, e.g., in FIG. 5 to be connected to the host aeronautical structure only through the lateral wall 3 of the main fuel tank. In the example embodiment of FIG. 5, the aperture stiffener 12 is in the form of a collar positioned around a circumference of the aperture 9 of the vent valve, with the collar overlapping only a portion of the lateral wall 3 adjacent the circumference of the aperture 9. As explained hereinafter, a parameter of the aperture stiffener 12, e.g., size of the collar, is chosen to compensate for loss of the rigidity of the lateral wall 3 due to presence of the at least one vent valve.

In one example embodiment, a single break-through aperture is provided in one of the lateral walls of the tank, in a position substantially close to the base 2.

In another example embodiment, a single break-through aperture is provided in each of two or more of the lateral walls of the tank, in positions substantially close to the base 2.

In another example embodiment, at least two break-through apertures are provided in one of the lateral walls of the tank, in a position substantially close to the base 2 (FIG. 3).

In another example embodiment, at least two break-through apertures are provided in each of two or more of the lateral walls of the tank, in positions substantially close to the base 2.

The position close to the base is advantageous because it permits operation even with a small quantity of fuel. Of the various embodiments, those which are symmetrical are preferred. It should also be noted that the valves are designed in such a way that their breaking takes place not only when the tank is 100% full, but generally in all cases in which there is a certain degree of impact on the ground, and therefore also when, for example, the tank is 50% full.

The parameters to be specified for the production of the valves are therefore the size, thickness and material of the valves and their positions in terms of height and width (on which sides and on how many sides they are to be positioned); and the size, thickness and material of the reinforcing areas which are to be positioned in such a way as to compensate for the loss of rigidity due to the presence of the valves.

By way of example, for a tank measuring approximately 1.0 m×1.0 m×0.5 m, made of light aluminium alloy with a wall thickness of approximately 1 mm, one solution considered acceptable is that in which four apertures measuring approximately 8-12 cm×10-20 cm (preferably approximately 10×15 cm) are provided in at least one wall of the tank. Each of these apertures can conveniently be closed by a breakable membrane made from light aluminium alloy having a thickness of 0.1-0.3 mm, or from a plastics material such as a polycarbonate. The material to be used for the membrane in each case is a fragile or elastic-fragile material with characteristics of low plasticity.

Alternatively, as stated above, the apertures could be simply engraved into the panel of the tank, thus creating a "trigger area" (a suitably weakened wall).

It should be pointed out that the normal operating pressures within a tank for aircraft are of the order of 1-3 bars, while an explosion occurs at approximately 15-17 bars. This observation is made in order to show that there is no danger that the breakable membrane, designed to rupture at 15-17 bars, will break in normal operating conditions.

The valve is thus designed for opening at a pressure that is at least 2 times, preferably about 3 times and more preferably, more than 3 times, the pressure at nominal conditions.

Typical predetermined pressure values are 12, 13, 14, 15, 16, 17, 18, 19 or 20 bars for a fuel tank where nominal pressure is 1-3 bars.

Figure 6:
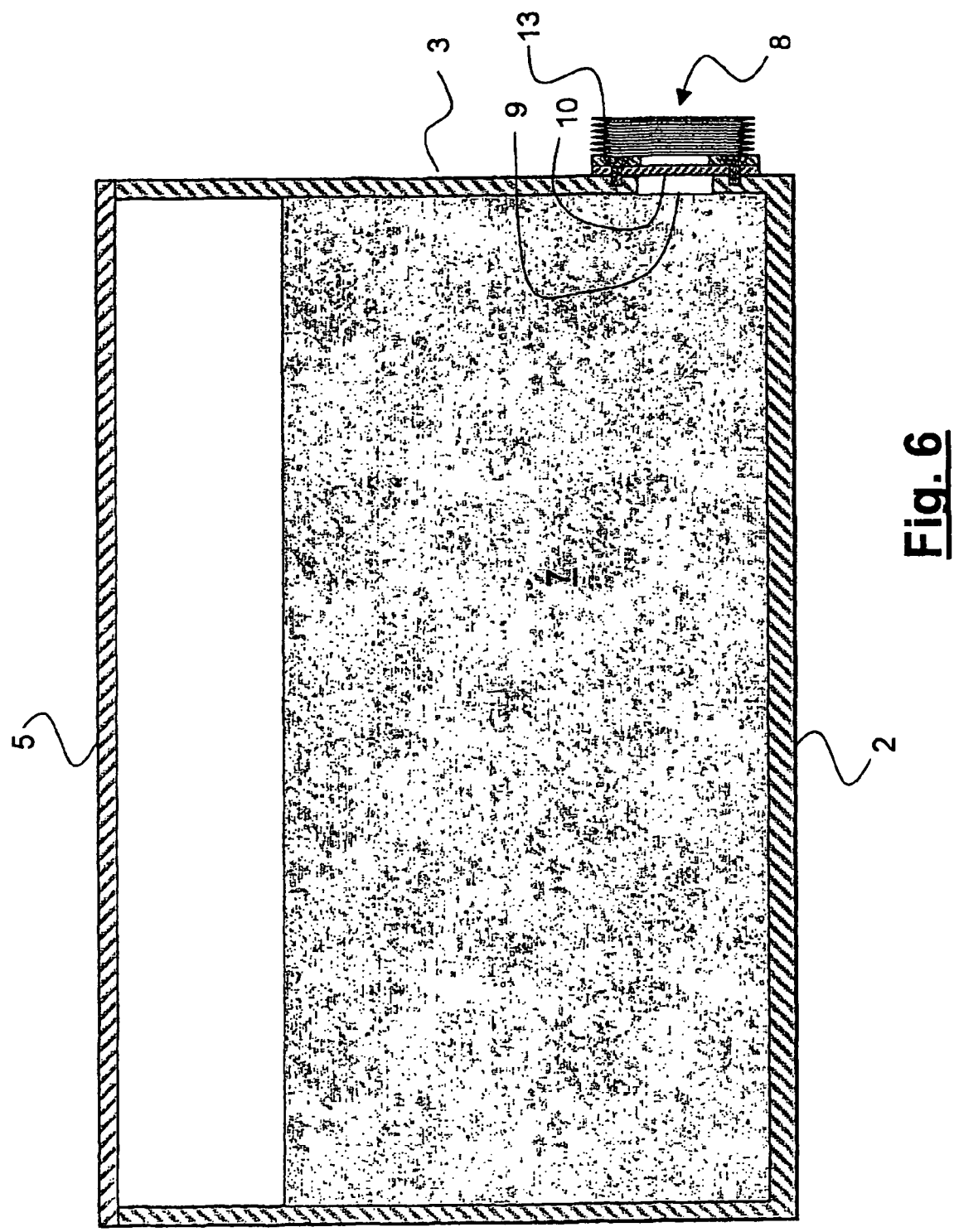
FIG. 6 shows an enlarged cross section of a tank according to an example embodiment with an auxiliary tank in normal conditions of use.
Figure 7:
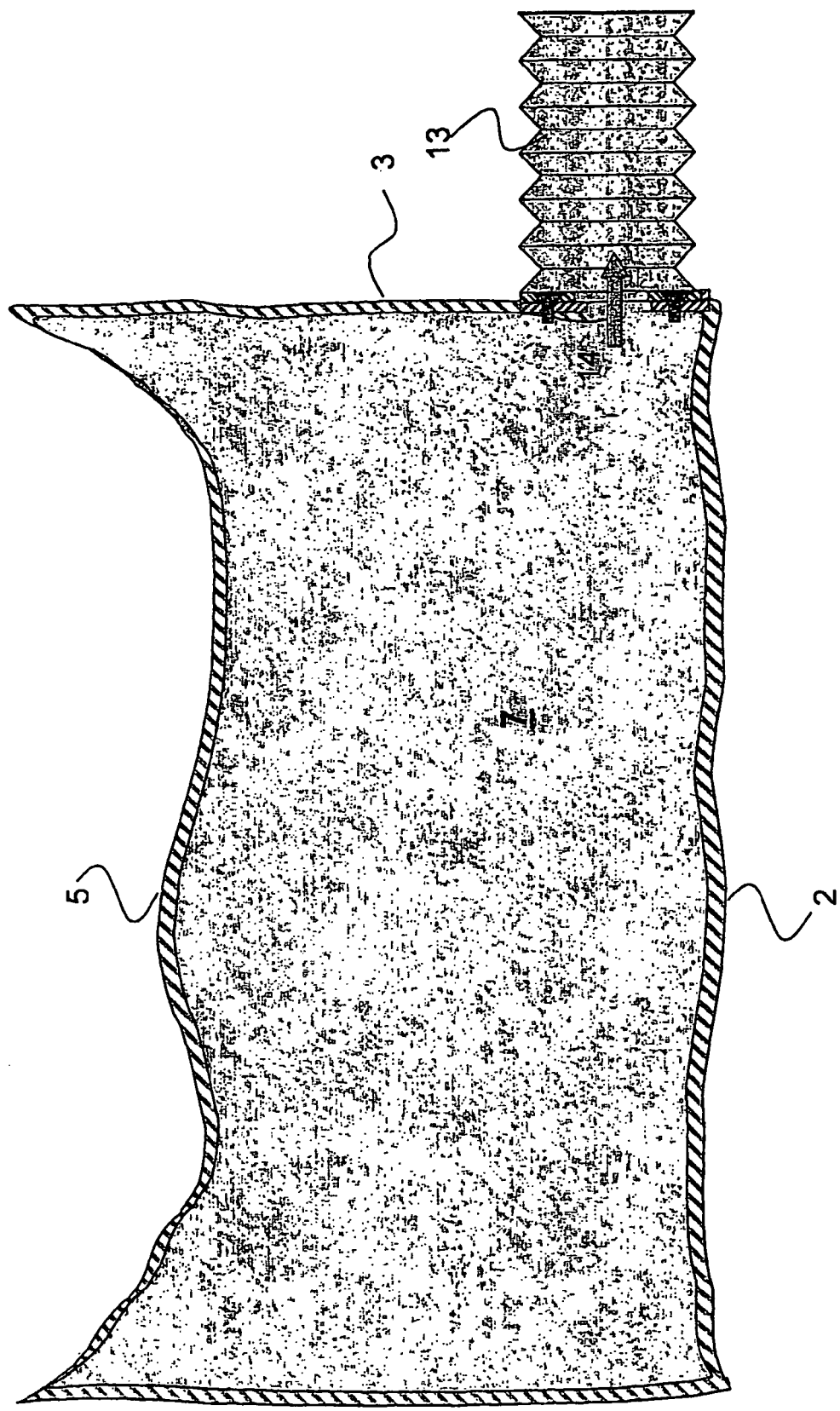
FIG. 7 shows an enlarged cross section of a deformed tank with the vent valve open and the auxiliary tank full.

According to an example embodiment, in the case of tanks for aircraft, particularly for helicopters, the vent valves 8 cooperate with auxiliary chambers 13 for containing the fuel which flows out of the said valves. In other words, the rupture of the breakable membranes 10 (in other words the opening of the valves 8) puts the tank into communication with the auxiliary chambers 13. In a particularly advantageous embodiment, these auxiliary chambers 13 are made in the form of bellows or the like. In a crash-free operating condition (with the tank not deformed, FIG. 6), and therefore with normal internal pressures, the valves 8 are closed and the bellows 13 are fully compacted. On the other hand (FIG. 7), if the tank is deformed (as a result of an impact) and the pressure within it increases beyond a certain limit (approximately 15 bars), the valves will rupture and the liquid will tend to flow out of the tank, thus filling the bellows, as indicated by the arrow 14. Thus the fuel will not be dispersed in a dangerous way outside the tank (in this case, the "tank" is considered to include the auxiliary tank(s) as well).

A solution similar to that applied and described in detail for an aeronautical tank, particularly of the helicopter type, can also be used as an energy release mechanism in case of the explosion of an explosive device in a hold of a commercial or military fixed-wing aircraft. Accordingly, the technology disclosed herein provides for the discharge of the energy to the outside, by contrast with known solutions in which the objective has been to "contain" the explosion.

Figure 8:
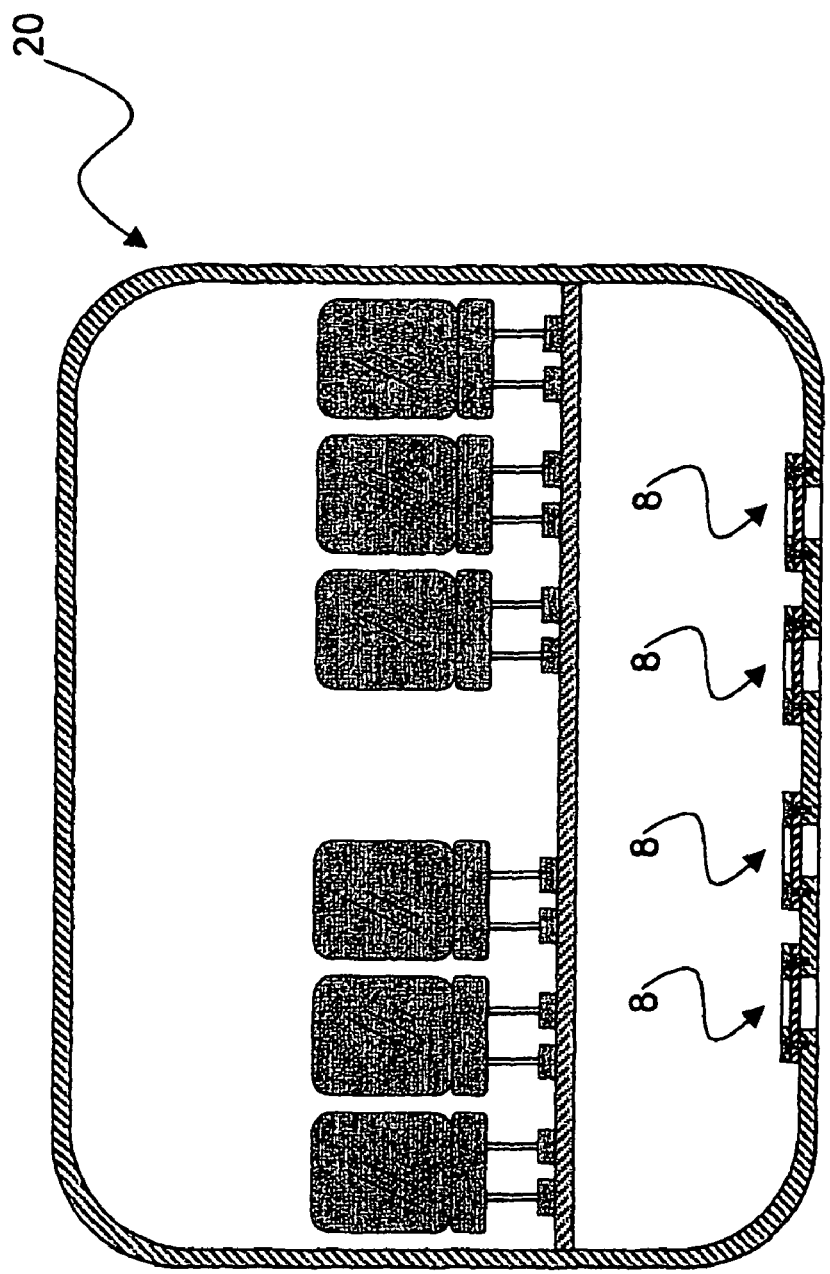
FIG. 8 shows a schematic cross section of a fuselage with an energy venting device according to an example embodiment.
Figure 9:
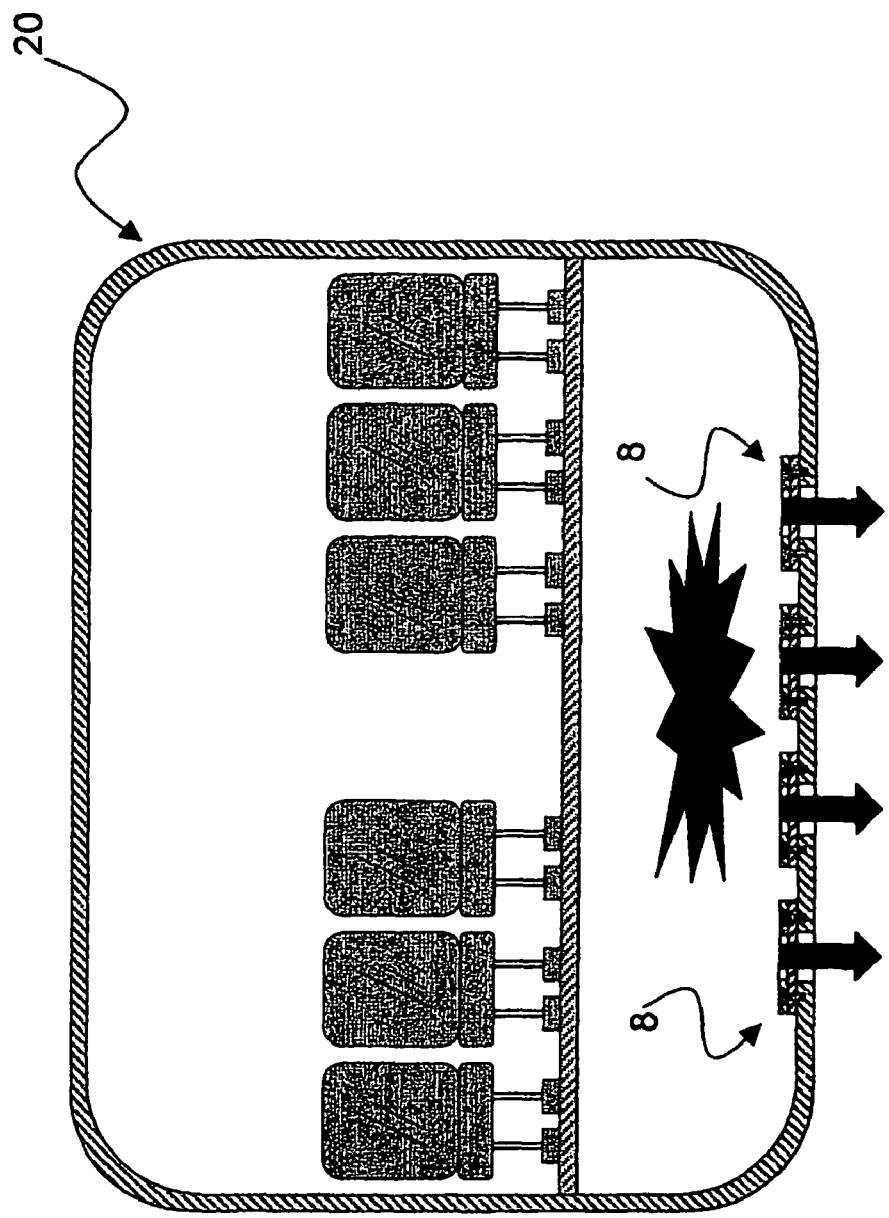
FIG. 9 shows the section through the fuselage of FIG. 8 in case of explosion.

FIG. 8 shows schematically a section of fuselage 20. According to an example embodiment, vent valves 8, entirely similar to those described and illustrated with reference to fuel tanks, are provided in the base of this fuselage. If an explosion occurs, the energy which is developed can be released through the valves 8 and will not cause tears or other damage to the fuselage (see FIG. 9). If the technology disclosed herein is applied to a fuselage (particularly to the hold) of an aircraft, it will clearly not be necessary to provide auxiliary chambers to enhance the explosion-proofing (by contrast with the application to fuel tanks).

Clearly, therefore, in the light of the above description, the technology disclosed herein can be applied in various ways. It can be used in subfloor tanks and baggage compartment structures (in fixed- and moving-wing aircraft), these structures being new or already in use and suitably modified.

The present invention can be subjected to numerous modifications, adaptations and replacement of parts with other functionally equivalent parts. All such modifications, adaptations and replacement of parts are considered to fall within the scope of protection of the present invention, which is limited only by the attached claims.

The invention claimed is:

1. A fuel tank positionable within a host aeronautical structure and having high energy absorption characteristics for aeronautical applications, the said fuel tank comprising:
   a substantially closed and substantially rigid main fuel tank comprising at least one lateral wall;
   at least one vent valve formed in the at least one lateral wall and which can be opened when a pressure exceeding a predetermined value is present within the substantially closed main fuel tank;
   a supplementary fuel tank configured to cooperate with the at least one lateral wall and adapted to receive fuel from said main fuel tank through said at least one vent valve when said at least one vent valve is open because of an overpressure within said main fuel tank;
   wherein said vent valve comprises a breakable membrane which is positioned to close a corresponding aperture, wherein said breakable membrane comprises a fragile material; and
   an aperture stiffener fixed to the at least one lateral wall, surrounding the at least one valve, and configured to provide rigidity reinforcement for the at least one lateral wall of the main fuel tank; wherein the aperture stiffener is in the form of a collar positioned around substantially only a circumference of the aperture of the vent valve.

2. The fuel tank according to claim 1, wherein the main fuel tank is arranged at a subfloor structure of an aircraft.

3. The fuel tank according to claim 1, wherein said supplementary fuel tank is compacted in its unused state with the vent valve closed, and expanded when the vent valve is open.

4. The fuel tank according to claim 1, wherein said pressure predetermined value is at least 3 times the pressure value within the main fuel tank at nominal conditions of operations.

5. The fuel tank according to claim 4, wherein said pressure predetermined value is at least 15 bars.

6. The fuel tank according to claim 1, wherein said fragile material comprises a metallic or plastics material.

7. The fuel tank according to claim 1, wherein said breakable membrane comprises a light aluminum alloy.

8. The fuel tank according to claim 7, wherein said breakable membrane comprises a light aluminum alloy having a thickness of between 0.1 mm and 0.3 mm.

9. The fuel tank according to claim 1, wherein said breakable membrane comprises polycarbonate.

10. The fuel tank according to claim 1, wherein the supplementary fuel tank comprises a bellows.

11. The fuel tank according to claim 1, wherein the at least one vent valve comprises an engraved area which forms a weakening in the said at least one lateral wall.

12. The fuel tank according to claim 1, wherein at least one of size, thickness and material of the aperture stiffener is chosen to compensate for loss of rigidity due to presence of the at least one vent valve.

13. The fuel tank according to claim 1, wherein the at least one vent valve comprises a breakable metallic diaphragm.

14. The fuel tank according to claim 1, wherein the at least one vent valve comprises a brittle material.

15. The fuel tank according to claim 1, wherein the at least one vent valve comprises a material which breaks substantially without elastic deformation.

16. The fuel tank according to claim 1, wherein the aperture stiffener is unattached to the host aeronautical structure.

17. The fuel tank according to claim 1, wherein the aperture stiffener is connected to the host aeronautical structure only through the lateral wall of the main fuel tank.

18. The fuel tank according to claim 17, wherein a parameter of the aperture stiffener is chosen to compensate for loss of the rigidity of the lateral wall due to presence of the at least one vent valve.

19. The fuel tank according to claim 1, wherein the aperture stiffener has a size chosen to compensate for loss of rigidity of the lateral wall due to presence of the at least one vent valve.

20. A method of operating a substantially closed and substantially rigid main fuel tank positionable within a host aeronautical structure, the method comprising:
    providing at least one vent valve which can be opened when a pressure exceeding a predetermined value is present within the substantially closed main fuel tank, wherein said at least one vent valve is provided in at least one lateral wall of the main fuel tank;
    providing an aperture stiffener to surround the at least one valve and to provide rigidity reinforcement for the at least one lateral wall of the main fuel tank wherein the aperture stiffener is in the form of a collar positioned around substantially only a circumference of the aperture of the vent valve;
    forming a breakable membrane to comprise a material which is fragile; and
    when said at least one vent valve is open because of an overpressure within said main fuel tank, providing a supplementary fuel tank cooperating with the said at least one vent valve to receive fuel through said at least one vent valve.

21. The method according to claim 20, wherein said main fuel tank is arranged at a subfloor structure of an aircraft.

22. The method according to claim 21, wherein opening said at least one vent valve comprises causing an opening of said at least one vent valve in the presence of a pressure which is at least twice the normal operating pressure in the said substantially closed main fuel tank.

23. The method according to claim 20, wherein opening said at least one vent valve comprises causing an opening said at least one vent valve in the presence of a pressure which is at least twice the normal operating pressure in the said substantially closed main fuel tank.

24. The method according to claim 23, wherein said opening the said at least one vent valve comprises causing an opening of said at least one vent valve at a pressure not less than about 15 bars.

25. The method according to claim 20, wherein said fragile material comprises a metallic or plastics material.

26. The method according to claim 25, wherein said main fuel tank is arranged at a subfloor structure of an aircraft.

27. The method according to claim 25, wherein opening said at least one vent valve comprises causing an opening of said at least one vent valve in the presence of a pressure which is at least twice the normal operating pressure in the said substantially closed main fuel tank.

28. The method according to claim 20, wherein opening said at least one vent valve comprises causing an opening of said at least one vent valve in the presence of a pressure which is at least three times the normal operating pressure in the said substantially closed main fuel tank.

29. The method according to claim 20, further comprising connecting the aperture stiffener to the host aeronautical structure only through the lateral wall of the main fuel tank.

30. The method according to claim 29, further comprising choosing a parameter of the aperture stiffener to compensate for loss of the rigidity of the lateral wall due to presence of the at least one vent valve.

31. The method according to claim 20, further comprising choosing a size of the aperture stiffener to compensate for loss of rigidity of the lateral wall due to presence of the at least one vent valve.

* * * * *

UNITED STATES PATENT AND TRADEMARK OFFICE
CERTIFICATE OF CORRECTION

PATENT NO. : 7,909,288 B2
APPLICATION NO. : 10/555439
DATED : March 22, 2011
INVENTOR(S) : Anghileri It is certified that error appears in the above-identified patent and that said Letters Patent is hereby corrected as shown below:

On the Title page, please correct the Assignee (73) to read as follows:

(73) Assignee: POLITECNICO DI MILANO Milano (IT)
AUGUSTA S.P.A. Samarate (Varese) (IT)

Signed and Sealed this
Fourth Day of October, 2011

David J. Kappos
*Director of the United States Patent and Trademark Office*